(12) United States Patent
Boudjemai et al.

(10) Patent No.: US 8,587,229 B2
(45) Date of Patent: Nov. 19, 2013

(54) METHOD AND ELECTRICAL MACHINE FOR BRAKING A THERMAL ENGINE OF VEHICLE DURING THE STOP PHASE THEREOF

(75) Inventors: Farouk Boudjemai, Marcoussis (FR); Jean-Marc Dubus, Combs la Ville (FR); Oussama Rouis, Créteil (FR); Sylvain Delion, Paris (FR); Khadija Elbaraka, Bussy St Georges (FR); Jean-Claude Matt, Dijon (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 365 days.

(21) Appl. No.: 12/663,424

(22) PCT Filed: Jun. 24, 2008

(86) PCT No.: PCT/FR2008/051133
§ 371 (c)(1),
(2), (4) Date: Jun. 18, 2010

(87) PCT Pub. No.: WO2009/007584
PCT Pub. Date: Jan. 15, 2009

(65) Prior Publication Data
US 2010/0244753 A1 Sep. 30, 2010

(30) Foreign Application Priority Data
Jun. 27, 2007 (FI) ........................................ 07 56086

(51) Int. Cl.
*H02P 3/12* (2006.01)
(52) U.S. Cl.
CPC ...................................... H02P 3/12 (2013.01)

USPC ........... 318/381; 318/716; 318/717; 318/700; 318/718; 318/719

(58) Field of Classification Search
CPC ........................................................ H02P 3/12
USPC .................................. 318/381, 700, 716–720
See application file for complete search history.

(56) References Cited

U.S. PATENT DOCUMENTS

| 4,459,536 A * | 7/1984 | Wirtz ............................... 322/10 |
| 4,720,638 A * | 1/1988 | Vollbrecht ................... 290/38 R |
| 5,254,915 A * | 10/1993 | Komatsu et al. .............. 318/369 |
| 5,261,501 A * | 11/1993 | Tsuchiya et al. .............. 180/412 |

(Continued)

FOREIGN PATENT DOCUMENTS

| DE | 32 30 607 A1 | 2/1984 |
| DE | 195 32 163 A1 | 3/1997 |

(Continued)

*Primary Examiner* — Bentsu Ro
*Assistant Examiner* — David Luo
(74) *Attorney, Agent, or Firm* — Berenato & White, LLC

(57) ABSTRACT

A method for braking the thermal engine of an automobile using a multiple-phase rotary electric machine (1) connected to the thermal engine and including a stator and a rotor (4) having at least one excitation winding (41). A shortcut of at least one phase of the multiple-phase rotary machine is included during the stop phase of the thermal engine. The multiple-phase rotary electric machine is capable of braking the thermal engine of an automobile during the stop phase thereof due to the fact that a shortcut is induced, during the stop phase of the thermal engine, of at least one of the phases thereof.

14 Claims, 6 Drawing Sheets

(56) References Cited

U.S. PATENT DOCUMENTS

| | | | |
|---|---|---|---|
| 6,094,025 A * | 7/2000 | Rosa | 318/381 |
| 6,104,155 A * | 8/2000 | Rosa | 318/381 |
| 7,038,406 B2 * | 5/2006 | Wilson | 318/140 |
| 7,095,196 B2 * | 8/2006 | Tokunou et al. | 318/375 |
| 2003/0114269 A1 | 6/2003 | Grassl et al. | |

FOREIGN PATENT DOCUMENTS

| | | |
|---|---|---|
| DE | 199 14 428 C1 | 11/2000 |
| EP | 0 792 769 A1 | 9/1997 |
| EP | 1533892 | 5/2005 |
| FR | 2 722 738 A1 | 1/1996 |
| FR | 2 838 576 A1 | 10/2003 |

* cited by examiner

METHOD AND ELECTRICAL MACHINE FOR BRAKING A THERMAL ENGINE OF VEHICLE DURING THE STOP PHASE THEREOF

FIELD OF THE INVENTION

The present invention relates to a method and a rotating electrical machine for braking a thermal engine of a motor vehicle during the stop phase thereof.

BACKGROUND OF THE INVENTION

As is known, a motor vehicle is equipped with rotating electrical machines, in particular an alternator or an alternator-starter.

With reference to FIG. 1, a rotating electrical machine in the form of a reversible alternator of the multi-phase type for a motor vehicle with a thermal engine is schematically illustrated.

Such a reversible alternator is called an alternator-starter.

In a known way, in one operating mode, this reversible alternator converts mechanical energy into electrical energy, in particular for recharging the battery of the motor vehicle and/or for supplying the vehicle accessories with electrical power. In this case, it is said that the reversible alternator is operating in alternator mode, that is to say, as a current generator.

In another operating mode, the reversible alternator converts electrical energy into mechanical energy, in particular for starting the thermal engine of the motor vehicle. In this case, it is said that the reversible alternator is working in starter mode, that is to say, as an electric motor.

Thus, owing to the alternator-starter, the thermal engine of the vehicle can be stopped, for example at a red light or in traffic jams, and said engine can be re-started for example according to a determined or predetermined strategy. This strategy takes into account, for example, the state of the engine gear box and clutch pedal; the engine being stopped when the engine gear box is at the dead point and clutch pedal action relaxed and vice-versa to re-start. This function is known as "stop-start".

In all cases, the alternator-starter fulfils this function in starter mode in order to save fuel, particularly when driving in town.

The alternator-starter, depending on its power, can also fulfil other functions in starter mode, that is to say, when it is working as an electric motor.

For example, as described in document WO 02/060711, it can be used to drive an accessory, such as an air-conditioning compressor, when the vehicle has stopped at red lights, or to assist in starting up an accessory, such as a turbo compressor.

It can be used to temporarily move the vehicle when parking.

As described for example in document WO 02/080334, it can prevent the thermal engine of the vehicle from stalling (function known as BOOST function) and, during braking or deceleration of the vehicle, charge one or more energy stores such as "super capacitors" or ultra-capacitors.

FIG. 1 illustrates a separate alternator-starter 1 of the type described in document WO 01/69762 to which reference should be made.

This alternator-starter 1 is mounted here instead of a traditional alternator and comprises a drive component in the form of a pulley 20 integrally joined to a shaft.

This alternator-starter 1 is connected to the crankshaft of the thermal engine of the motor vehicle here via its drive component 20 belonging to a movement transmission device situated between the alternator-starter and the thermal engine.

More precisely, this pulley 20 is connected to a pulley 21 of the crankshaft of the thermal engine by means of at least one belt 40.

This alternator-starter 1, as is more clearly visible in FIG. 2, which is a simplified cross-sectional view of the alternator-starter, comprises a casing 10 carrying a stator 16 surrounding a rotor 4 integrally joined to a shaft 14, of axis X, carrying the pulley 20 at its front end.

The stator 16 comprises an annular housing 18 in the form of a stack of metal sheets with recesses forming grooves for mounting armature coils 5 having chignons extending on both sides of the ends 24, 26 of the housing 18.

The housing 18 is therefore made of ferromagnetic material.

A small air-gap exists between the internal periphery of the housing 18 and the external periphery of the rotor 4.

The alternator in FIG. 1 comprises three phases. Alternatively, it comprises more than three phases, for example five, six or seven phases.

Each phase comprises at least one armature coil 5.

These coils 5 are angularly offset and connected in a star or triangle as is visible in FIG. 1. They are connected at their output to an alternating current rectifying device 8 as described below.

The coils or windings 5 can be implemented with conducting wire wound in the recesses of the stator housing, for example in a corrugated way or in the form of coils wound around a tooth of the stator housing, or with conductor elements in the shape of bars mounted in the recesses and joined together for example by welding to form networks.

Alternatively, each phase comprises at least two coils mounted in series or in parallel with the presence in this case of two rectifier bridges mounted in parallel and star-star or star-triangle or triangle-triangle connections of the triphase coils of the phases. One or more coils 5 are therefore mounted in each recess of the stator housing.

The shaft 14 of the rotor 4 is mounted centrally to rotate in the casing by means here of ball bearings without a reference symbol.

The rotor 4 illustrated in FIG. 2, as described in document EP A 0 515 259, is a clamp rotor comprising ferromagnetic polar wheels 50, equipped with flanges having teeth on their external periphery.

A field coil 41 is mounted between the flanges. Permanent magnets can be inserted between the teeth of the polar wheels, as described for example in document FR A 2 793 085.

Alternatively, the rotor has projecting poles, a field coil being mounted around each projecting pole belonging to the rotor housing, for example in the form of a stack of metal sheets.

Alternatively, this rotor with projecting poles also comprises permanent magnets alternating circumferentially with the field coils as described in document WO 02/054566.

The casing comprises at least two parts perforated for circulation of the air. One of these parts is called the front bearing and the other part is called the rear bearing. The bearings are metallic and connected to the ground of the motor vehicle.

The rotor then supports, at least one of its axial ends, an internal fan, without a reference symbol in FIG. 2, to cool the alternator, as is visible in the two documents WO 02/054566 and EP A 0 515 259.

The rear bearing supports a brush holder illustrated by a rectangle with dotted lines in FIG. 2, whose brushes 42, 43 (FIG. 1) cooperate with slip rings 44, 45 supported by the rear end of the shaft 14. These rings are connected electrically to the ends of the field coil(s) 41.

When the thermal engine of the motor vehicle rotates, the pulley 20, shaft 14 and rotor 4 are also driven in rotation and the coil(s) 41 are supplied with electrical power by means of the brushes. The inductor rotor 4 is then magnetized, a magnetic field is created and the coils 5 of the induced stator generate an induced AC current.

The current rectifying device 8 in FIG. 1, in a synchronous manner, converts this induced AC current into DC current in order to charge the battery and/or supply the electrical consumers in the on-board electrical network of the vehicle.

This rectifying device 8 here belongs to an electronic control and power unit 2, which also comprises a management module 9, which receives data enabling the position and rotational speed of the rotor 4 of the alternator-starter 1 to be determined. This data, for example, is data provided by sensors 11, such as Hall-Effect sensors. These sensors are mounted for example on an angularly adjustable sensor holder as described in document WO 01/697 cited above (see for example FIGS. 7 and 9). Alternatively, the sensors 11 are replaced by a resolver.

The unit 2 here is remote in relation to the alternator-starter, a cable and connectors providing the link between the rear bearing of the alternator-starter 1 and the unit 2.

The rectifying device 8 comprises drivable elements for rectifying the current, such as transistors 7-7' mounted in parallel on diodes 6-6' as described for example in document FR-A-2 745 445. The transistors are advantageously MOSFET type power transistors and constitute static type switches, which can be controlled, in starter mode, by acting on the grids of these transistors. These transistors 7-7' integrate by design the diodes 6-6'.

The current rectifying device 8 belongs to a power stage of the unit 2. It constitutes a reversible power converter which assures the driving when functioning in starter mode and the synchronous rectifying in alternator mode.

The voltage regulator of the alternator-starter 1 here also belongs to the module 9. For the record, it will be recalled that the voltage regulator drives the field coil 41 of the rotor 4 via the brushes 42, 43, the slip rings 44, 45, a commutator and wire connections as described in document FR 2 710 199 for example. In FIG. 1 the electrical line EXC connects the voltage regulator of the module 9 to the brush 43, itself connected to one end of the coil 43, whose other end is connected to the track 44 and to the brush 42 connected to the ground.

The module 9 thus manages voltage regulation when the machine functions in alternator mode and also the power in starter mode and alternator mode. This module 9 can also manage safety functions and monitor the state of the battery and the state of the battery charge and/or assure other functions, particularly during the braking or deceleration of the motor vehicle as described in document WO02/080334 cited above.

This module 9 comprises drivers to drive the grids of the transistors 7-7'. Thus, the module 9 is configured, via the drivers, to deliver as output signals A, B, C and A', B', C' to the grids of the transistors 7.

This module 9 may be equipped with a device to protect against over-voltages as described in document WO 2005/025025 to which reference should be made.

As described in this document and as is visible in FIG. 1, each output of phase coil 5 is associated with two transistors 7-7' of the MOSFET type with integrated diodes 6-6'. These two transistors 7-7' belong to an arm or branch 81, on the one hand, situated between an electrical power supply line 83, known as the positive line, connected to the positive terminal 82 of the battery B and to the positive potential 85 of at least one on-board electrical network of the vehicle and, on the other hand, a line 84, known as the negative line, connected to the ground.

The number of arms or branches 81 depends on the applications and particularly on the number of phases of the alternator-starter.

The transistors 7-7', constituting controlled power switches, are thus grouped by pairs of transistors connected to the same output of a phase coil 5. The power transistor 7', 6' connected to the positive line 83 is called a "high side" transistor, while the power transistor 7, 6 connected to the negative line 84 is called a "low side" transistor.

The drivers specifically act on the grids of the transistors 7-7' to make them "conducting" (transistor closed) or blocked (transistor open). These drivers receive data provided by the resolver or the position sensors 11 of the rotor 4 together with logic type data for validating the alternator mode and for validating the starter mode.

For more precise details, reference should be made to document WO 2005/025025 cited above.

The management module 9, in the way cited above, is configured for controlling the transistors 7-7' and for delivering signals A, B, etc to the grid of the latter to make these transistors "conducting" or open; each driver being associated here with two signals A, A'-B, B'-C, C'.

In starter mode, the device 8 is an inverter, which supplies the coils 5 of the stator 16 phases with power; the transistors 7-7' being then driven. For example, an advantageously maximum DC current is imposed in the field coil(s) of the rotor, constituting the inductor of the alternator, and de-phased signals which are ideally sinusoidal and alternatively trapezoidal or square are delivered to the coils of the stator phases.

In alternator mode, the device 8 is a rectifying current bridge to rectify the AC current of coils 5 of the phases to DC current. The transistors 7-7' are not driven in this alternator mode; the diodes 6-6' are then active.

The module 9 can also receive data about the temperature of the alternator-starter and/or the rectifying device 8 or receive data from the engine control unit (ECU). In this FIG. 1, the electrical connection line to this engine control unit is represented by the reference symbol ECU.

This module 9 thus comprises hardware resources, in particular a micro-processor and memory, a multi-channel connector, and possibly software resources, particularly one or more stop/re-start algorithms to fulfil these various functions. These various functions can also be fulfilled on the basis of ASIC-type circuits or in a general manner by cabled logic.

The module 9 is supplied with power by the battery B of the vehicle to which it is connected electrically by means of a switch 12 controlled, for example, by the ignition key of the vehicle.

The module 9 optionally comprises means for recognizing a coded signal authorizing starting the vehicle engine and drives the MOSFET transistors 7-7' only if it receives the coded signal.

Alternatively, the alternator is not reversible as described in document EP A 0 515 259 for example.

In this case the current rectifying device is a bridge of diodes.

SUMMARY OF THE INVENTION

The object of the invention is to take advantage of the alternator or the alternator-starter of the motor vehicle to brake the thermal engine of the motor vehicle during the stop phase thereof.

According to the invention, a method for braking a thermal engine of a motor vehicle by means of a multi-phase rotating electrical machine connected to the thermal engine and comprising a stator, a rotor comprising at least one field coil, is characterized in that at least one phase of the rotating electrical machine is short-circuited during the stop phase of the thermal engine.

According to the invention a multi-phase rotating electrical machine intended to be connected to the thermal engine of a motor vehicle of the type comprising a stator, a rotor comprising at least one field coil, is characterized in that it is intended to brake the thermal engine of a motor vehicle, during the stop phase thereof, by being equipped with short-circuit means in order to short-circuit at least one of its phases during the stop phase of the thermal engine.

On account of the invention, the thermal engine is assisted in stopping and the shutdown time of the thermal engine is reduced because a resistive torque is generated on the rotor shaft of the rotating electrical machine during the stop phase of the thermal engine, owing to the fact that at least one phase of the machine is short-circuited. Thus, the rotor and the rotor shaft connected to the crankshaft of the thermal engine are decelerated. The crankshaft is therefore also decelerated.

Thus, a resistive torque is imposed on the crankshaft of the thermal engine during this phase by controlling the rotating electrical machine. This resistive torque decelerates and thus brakes the thermal engine. This braking is done without mechanical contact.

More precisely, by short-circuiting one or more phases a closed circuit between one or more phases is created.

Advantageously, the cogs) of the rotor are supplied with electrical power, that is to say excited, so that the inductor rotor is magnetized and generates an induced current in the closed circuit comprising at least one phase coil, connections, wiring or static switches. This current gives rise to losses through the Joule effect and to a resistive torque on the rotor shaft.

In other words, the induced current in the closed circuit comprises a reactive portion linked to the induction of the rotor and an active portion linked to the resistance of the closed circuit. The reactive portion is square with the electromotive force which generates it and does not create torque, while the active portion is in phase with this electromotive force and generates a resistive torque on the rotor shaft.

The rotating electrical machine acts as an electromagnetic decelerator during the stop phase of the thermal engine.

In one embodiment, all of the phases are short-circuited in order to achieve a better result and better efficiency.

Thus, in all cases the thermal engine can be re-started more quickly, for example after stopping at a red light or in traffic jams.

Thus, currents are generated in a non-conventional manner in the stator housing of the machine during this stop phase of the thermal engine constituting a braking phase by deceleration of the thermal engine.

This is made possible because the stop phase is shortened so that the stator housing does not overheat.

The invention takes advantage of the phase coils and the stator housing, which is preferably made of ferromagnetic material.

Of course, if the rotor of the machine is equipped with magnets, this shutdown time is reduced further.

All this is beneficial to the comfort of the passenger.

According to another characteristic, the field coil(s) of the rotor of the machine are driven during the stop phase of the thermal engine.

Owing to this characteristic, the current in the closed circuit can be adjusted and varied in order to obtain better deceleration and braking of the rotor and thus of the rotor shaft of the machine. This braking can therefore be controlled and is thus optimum.

Thus, the vibrations due to the acyclisms of the thermal engine during the stop phase thereof can be filtered, reduced or even eliminated.

This is beneficial to the comfort of the passenger and enables the noise to be reduced still further.

The machine is equipped with means to supply power to the field coil(s) of the rotor.

In one embodiment, these means are distinct from the voltage regulator which a motor vehicle alternator or an alternator-starter comprises. These means of power supply can be controlled by the engine control unit (ECU).

In one embodiment, these means are comprised by the voltage regulator in such a manner that advantage is taken of the latter.

In one embodiment, the excitation of the field coil and the short-circuit of at least one phase are prolonged after the thermal engine has stopped.

This is to prevent the thermal engine turning in reverse, more precisely, oscillating around its point of equilibrium, after it has stopped, particularly if it comprises an odd number of cylinders.

The shutdown of the engine is thus stable and damped well.

In one embodiment, advantage is taken of the current rectifying device, which an alternator or an alternator-starter comprises.

Thus, in the case of an alternator at least one current rectifying element of the current rectifying device is replaced by a controllable switch, such as a drivable transistor of the MOSFET type. Thus, at least one controllable switch, such as a diode connected to an electrical power supply line of the current rectifying device, is mounted instead of a current rectifying element and this switch is made "conducting" during the stop phase of the thermal engine in order to short-circuit at least one phase of the machine.

This alternator is associated with a starter configured to fulfil the stop-start function.

In one embodiment, the current rectifying device belongs to an electronic command and control unit comprising a management module configured to drive the driven switches and the starter.

In the case of an alternator-starter, advantage is taken of the drivable switches, which the current rectifying device of the alternator-starter comprises. These switches are thus controllable.

More precisely, at least one of these drivable switches connected to a power supply line of the current rectifying device is used and this switch is made "conducting" during the stop phase of the thermal engine in order to short-circuit at least one phase of the machine.

Of course, alternatively, at least two current rectifying elements of an alternator belonging to the same power supply line of the rectifying device can be replaced by two controllable switches or at least two of the drivable switches of an alternator-starter belonging to the same power supply line of the rectifying device can be used.

In one embodiment, advantage is taken of the management module, which the alternator-starter comprises in the way cited above, in order to configure said module so as to drive the switch(es) during the stop phase of the thermal engine.

In one embodiment, the controllable switch(es) are drivable transistors of the MOSFET type.

In another embodiment these controllable switches are thyristors.

Generally, any other controllable component can be considered, in particular bipolar transistors, IGTBs and relays.

Of course, all the features cited above should be considered alone or in combination.

Other advantages will become evident by referring to the following description and the appended drawings.

DETAILED DESCRIPTION

In the description, which follows, identical or similar elements are assigned the same reference symbols.

Figure 3:
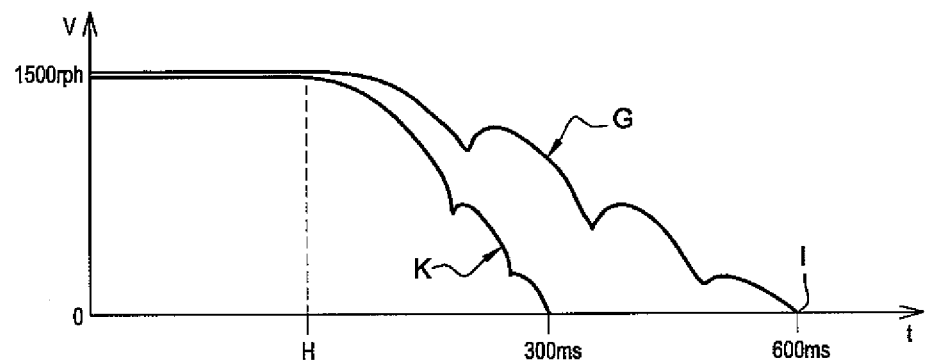
FIG. 3 is a diagram comparing the prior art and the present invention; the Y-coordinate being the rotational speed of the rotor of the rotating electrical machine during the braking phase and the X-coordinate being the time.

The curve G in FIG. 3 represents what occurs during the stop phase of a motor vehicle thermal engine. The Y-coordinate shows the rotational speed V in rpm of the shaft 14 of the rotor 4 of the alternator-starter 1 and the X-coordinate shows the time t.

The rotational speed of the shaft 14 is representative of that of the motor vehicle thermal engine, more precisely, that of its crankshaft. Indeed, the belt transmission device 20, 21, 40 has a transmission ratio of approximately 2.5 to 3.

In this FIG. 3, it is clear that the idling speed of the thermal engine corresponds overall to an idling speed of 1500 rpm.

The stop phase of the thermal engine, for example at a red light or in traffic jams, starts overall at point H and finishes at point I, that is to say, a total duration of 600 milliseconds (ms).

It is thus desirable to reduce this time.

To accomplish this, a braking method by means of a multiphase rotating electrical machine connected to the thermal engine is proposed. According to this method, at least one phase of the rotating electrical machine is short-circuited during the stop phase of the thermal engine.

The rotating electrical machine is equipped with short-circuit means to short-circuit at least one of its phases during the stop phase of the thermal engine.

Figure 1:
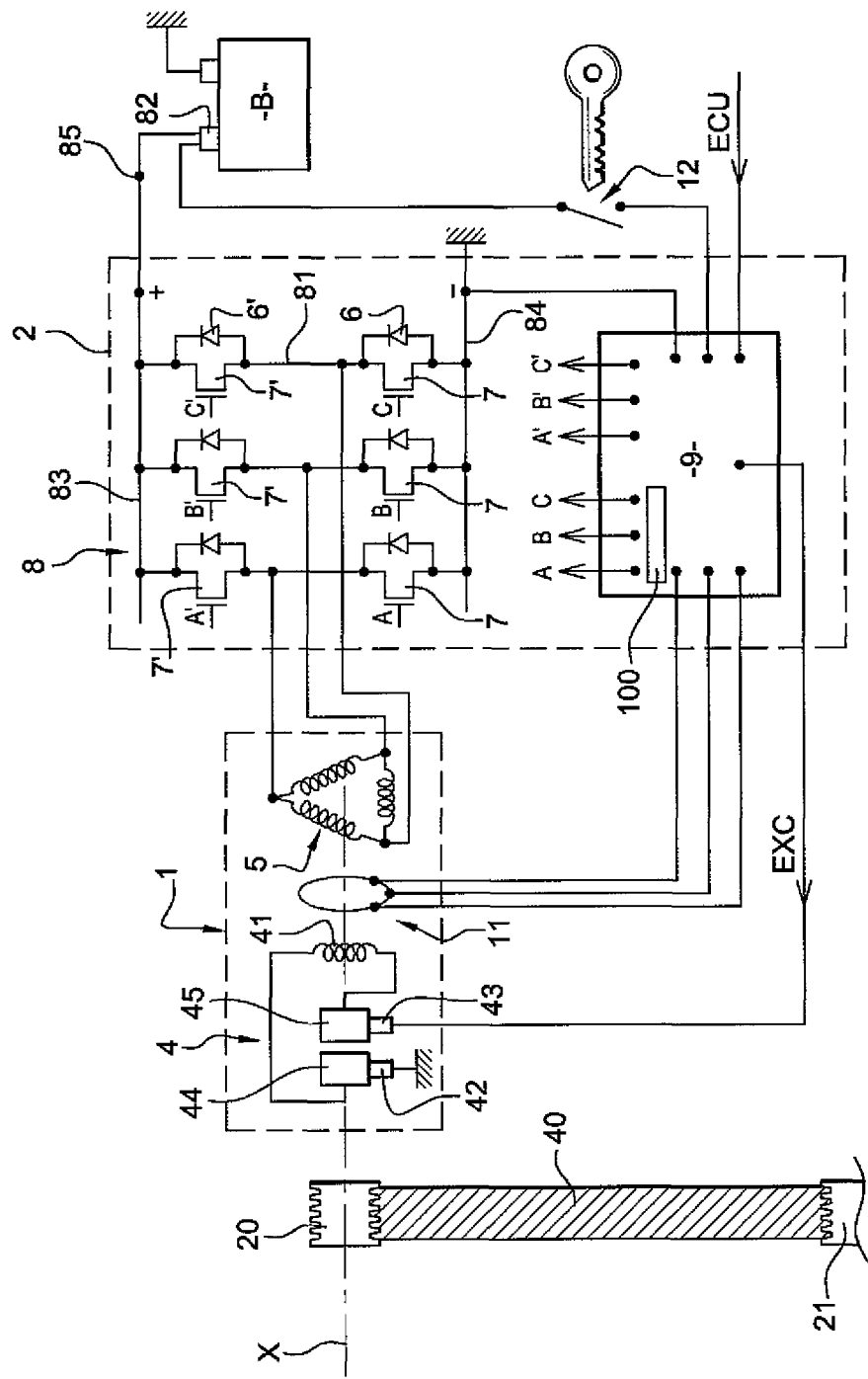
FIG. 1 is a diagrammatic view of an alternator-starter for a motor vehicle thermal engine of the prior art, whose management module, according to a first embodiment of the invention, is configured to bring about a short-circuit of at least one phase of the alternator-starter during the stop phase of the thermal engine.

In the embodiment in FIG. 1 the rotating electrical machine, in the way cited above, is an alternator-starter and the curve K in FIG. 3 is the curve obtained according to this first embodiment.

Thus, with reference to the curve K according to the invention it is seen that the shutdown time (300 ms) is reduced by half.

In this embodiment in FIG. 1 all of the phases of the machine are short-circuited and the management module 9 is configured accordingly. More precisely, it comprises a circuit 100, intended when functioning in starter mode, that is to say, when the "high side" transistors 7' are drivable, during the stop phase of the thermal engine, to make these transistors 7' "conducting", which are then all connected, on the one hand, to one of the phases and, on the other hand, to the positive line 83.

The circuit 100 acts on the grids of the transistors 7' which all belong to the positive line 83, owing to the fact that they are connected to the latter.

Here, signals A', B', C' act on the grids of the transistors 7' to make these "conducting".

The circuit 100 is activated during this stop phase and receives data to this effect. This data comes from the ECU line and the engine control unit, for example. The position of the gear box—the dead point position—and the position of the clutch pedal—action on the pedal relaxed—can also be taken into account. The position of the brake pedal can also be taken into account. Everything depends on the strategy of the "stop-start" function.

The all or nothing driving of these transistors 7' is inhibited during this stop phase. The circuit 100 and the transistors 7' thus form part of the short-circuit means.

Of course, the reverse can be done and, during this stop phase, all "low side" transistors 7 connected to the negative line 84, that is to say, belonging to the latter, can be made "conducting".

During this stop phase, the alternator-starter is made to work like an electromagnetic decelerator.

More precisely, in this embodiment, during the stop phase of the thermal engine, the coil(s) 41 of the inductor rotor 4 are excited, that is to say, supplied with power electrically. The rotor is thus magnetized so that induced currents are created in the coils 5 of the phases carried by housing 18, here made of ferromagnetic material, of the stator 16 in FIG. 2.

A closed circuit between the phases exists owing to the fact that each coil 5 here is connected electrically to the line 83. This closed circuit comprises a closed elementary circuit for each phase, this elementary circuit comprising the phase coil, electrical connections, wiring and the particular MOSFET transistor made "conducting".

Currents are created in the coils 5 of the phases with losses appearing through the Joule effect. This dissipation of power by losses through the Joule effect, by virtue of the conservation of energy, implies that identical power is absorbed at the inductor rotor by resistive torque appearing on the rotor shaft 14 of the rotating electrical machine.

The shaft 14 of the rotor 4 is thus slowed down because resistive torque, opposed to the rotation of the shaft 14, is created. The thermal engine, via the transmission device 20, 21 and 40, is thus decelerated and braked without mechanical contact.

During this stop phase, the field coil(s) 41 of the rotor 4 are supplied with power electrically by the excitation line EXC connected to the voltage regulator, in this case integrated into the module 9.

Figure 2:
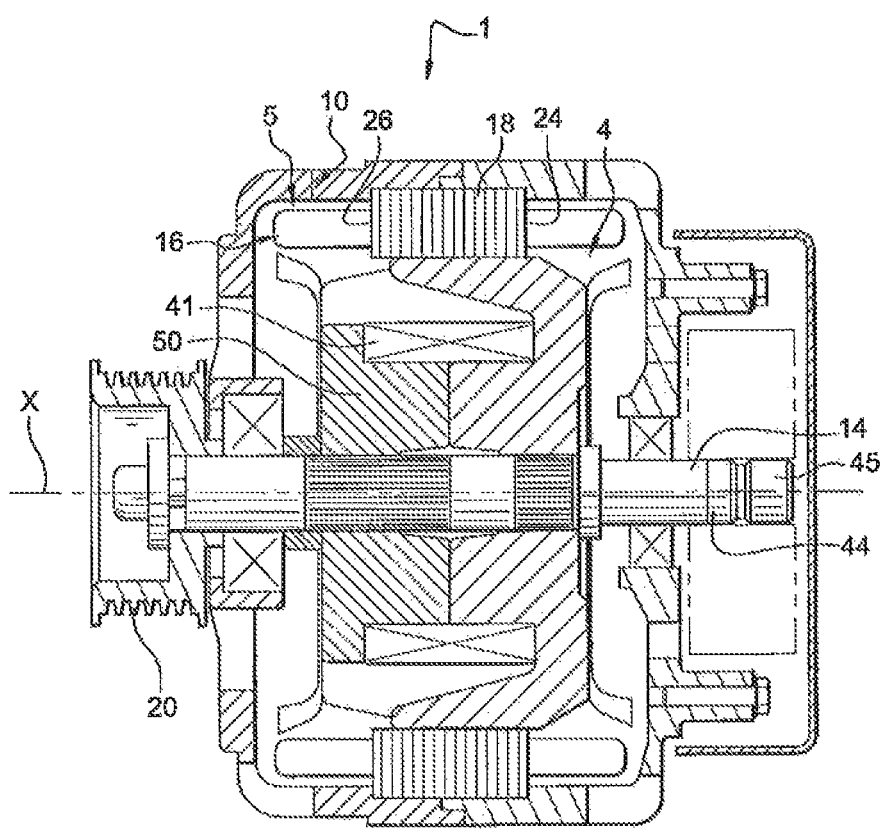
FIG. 2 is a simplified cross-section of the casing carrying the stator and the rotor of the alternator-starter in FIG. 1.

The voltage regulator thus belongs to the means of supply of power, here to the coil 41 in FIG. 2.

This is implemented in one embodiment by supplying power electrically to the coil(s) 41 with constant current to create induced currents in the phases of the stator, more precisely, in the coils 5 thereof.

Figure 4:
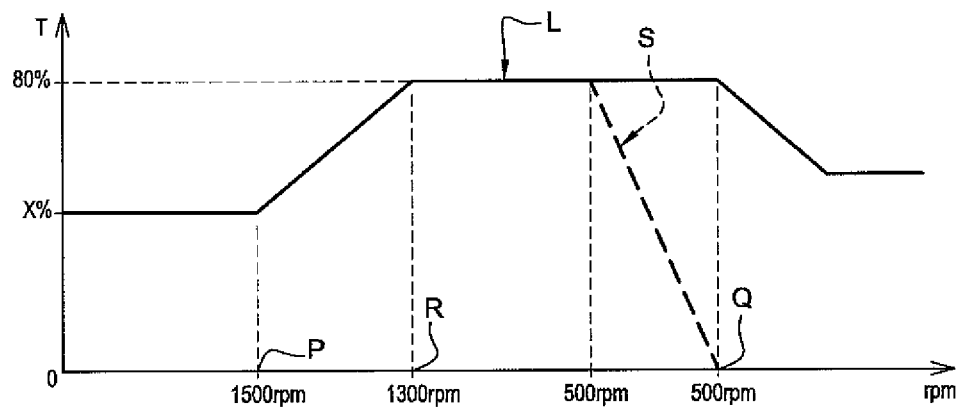
FIG. 4 is a diagram where the Y-coordinate is the duty cycle rate of the field coil(s) of the rotor in the rotating electrical machine and the X-coordinate is the time.

In another embodiment, the one in FIG. 4, this current is modulated by supplying the coil(s) 41 with power electrically in a driven manner. In this embodiment, the coil(s) 41 are driven by supplying the latter with current by means of the voltage regulator in pulse mode, of the "pulse width modulated" (PWM) type; the regulator being driven by a microprocessor belonging to the management module 9, for example.

The duty cycle, which is visible in FIG. 4, is made to vary, the duty cycle T, shown as the Y-coordinate, as a function of the revolutions per minute (rpm) of the shaft 14, shown as the X-coordinate.

The curve L is obtained; the stop phase of the thermal engine and of the alternator-starter occurring between points P and Q.

The duty cycle increases starting from point P up to point R.

Then, it remains at its maximum (approximately 80%) up to point Q.

Subsequently, it decreases then remains stable beyond the stop of point Q which corresponds to the shutdown of the thermal engine.

Alternatively, for example towards 500 rpm, this duty cycle could have been decreased, as is visible with dotted lines (curve S) in FIG. 4. This solution is less satisfactory since at point Q the thermal engine may be subject to movement in the reverse direction, more precisely, to oscillations around its position of equilibrium particularly after a fuel injection problem.

By continuing to drive the coil(s) 41, as well as the short-circuit, and thus by maintaining a duty cycle, this problem is avoided.

The shutdown of the thermal engine is therefore prolonged.

In addition, the rotor 41 is pre-magnetized, which prepares the electrical machine for more rapid re-starting.

By varying the supply of current to the coil 41, that is to say, by driving the latter, the vibrations can be absorbed in a suitable way and the noise reduced, making it possible to further improve the comfort of the occupants of the vehicle during a "stop-start" period.

In fact, by referring to FIG. 3 and by comparing the curves G and K, it can be seen that the curve G has bumps due to the movements of the pistons of the thermal engine when the latter stops. The thermal engine is then subject to the phenomena of acyclisms.

The curve K according to the invention enables these phenomena to be minimized, the bumps being greatly reduced.

By driving the field coils 41, the induced currents of the closed circuit are adjusted and made to vary so as to absorb the vibration phenomena better, further increasing the comfort of the passengers in the vehicle during a stop and re-start (stop-start) of the vehicle and reducing the noise even more.

Optimum braking of the thermal engine is achieved by deceleration of the shaft 14.

This is also advantageous for reducing the shutdown time of the thermal engine.

The deceleration and braking of the thermal engine are better controlled by making the alternator-starter work in a non-conventional way like an electromagnetic decelerator.

After the, in this case prolonged, shutdown of the thermal engine, in another embodiment the alternator-starter can work in starter mode in order to position the pistons of the thermal engine well, with the aim of improving re-starting, especially as the rotor is already pre-magnetized.

Of course, the curve L depends on the applications and the number of pistons of said thermal engine.

Alternatively, the alternator-starter is associated with a supplementary starter, particularly for a cold start of the thermal engine as described in document WO 01/11231. For more precise details, reference should be made to this document, particularly FIG. 1 of the same. In this case, one or more temperature sensors are connected to the module 9, as well as detection means to detect a failure to start; said module comprising comparison means.

Figure 5:
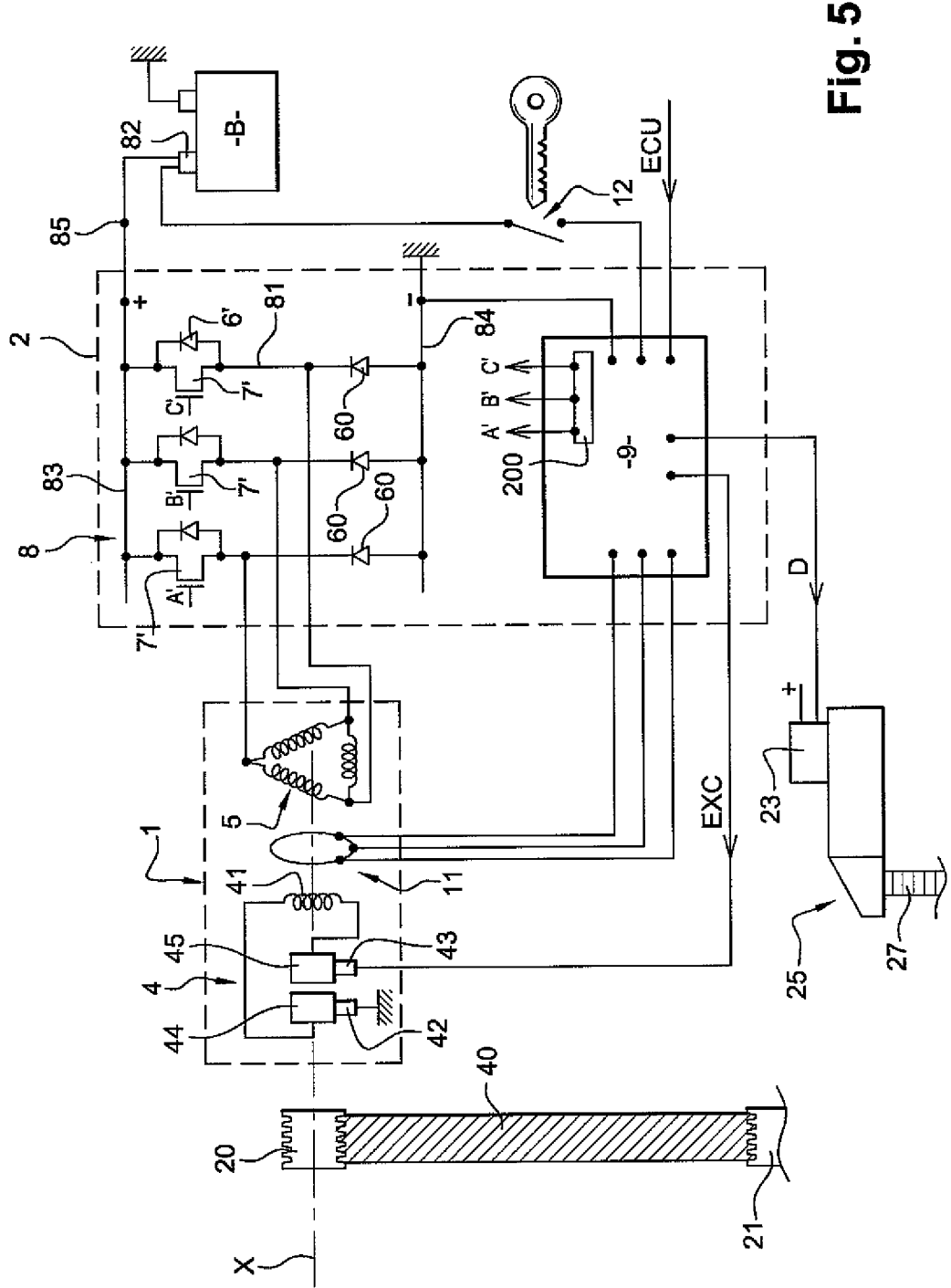
FIGS. 5 to 7 are views similar to FIG. 1 for a second, third and fourth embodiment of the invention respectively.

In one embodiment, one of the series of transistors 7-7' can be replaced by diodes 60, as is visible in FIG. 5.

In this FIG. 5, according to a second embodiment of the invention, all the "low side" transistors connected to the negative line 84 are replaced by diodes 60. These diodes are non-drivable in contrast to the transistors 7-7'. Alternatively, the reverse can be done and all the "high side" transistors connected to the positive line 83 can be replaced by diodes.

In this case, it is a matter of a simple alternator associated with a starter 25 enabling the thermal engine to be re-started. The contactor 23 of the starter 25 is then connected to the module 9 by means of a line D. In this exemplary embodiment, 27 represents a section of the starter crown and 200 a circuit for driving the grids A', B', C' of the "high side" transistors 7'. This device receives data from the engine control unit via the ECU line. It can also receive data from the sensors 11.

The circuit 200 belongs to the short-circuit means as well as transistors 7'. The module 9 also drives the starter 25, configured accordingly.

Figure 6:
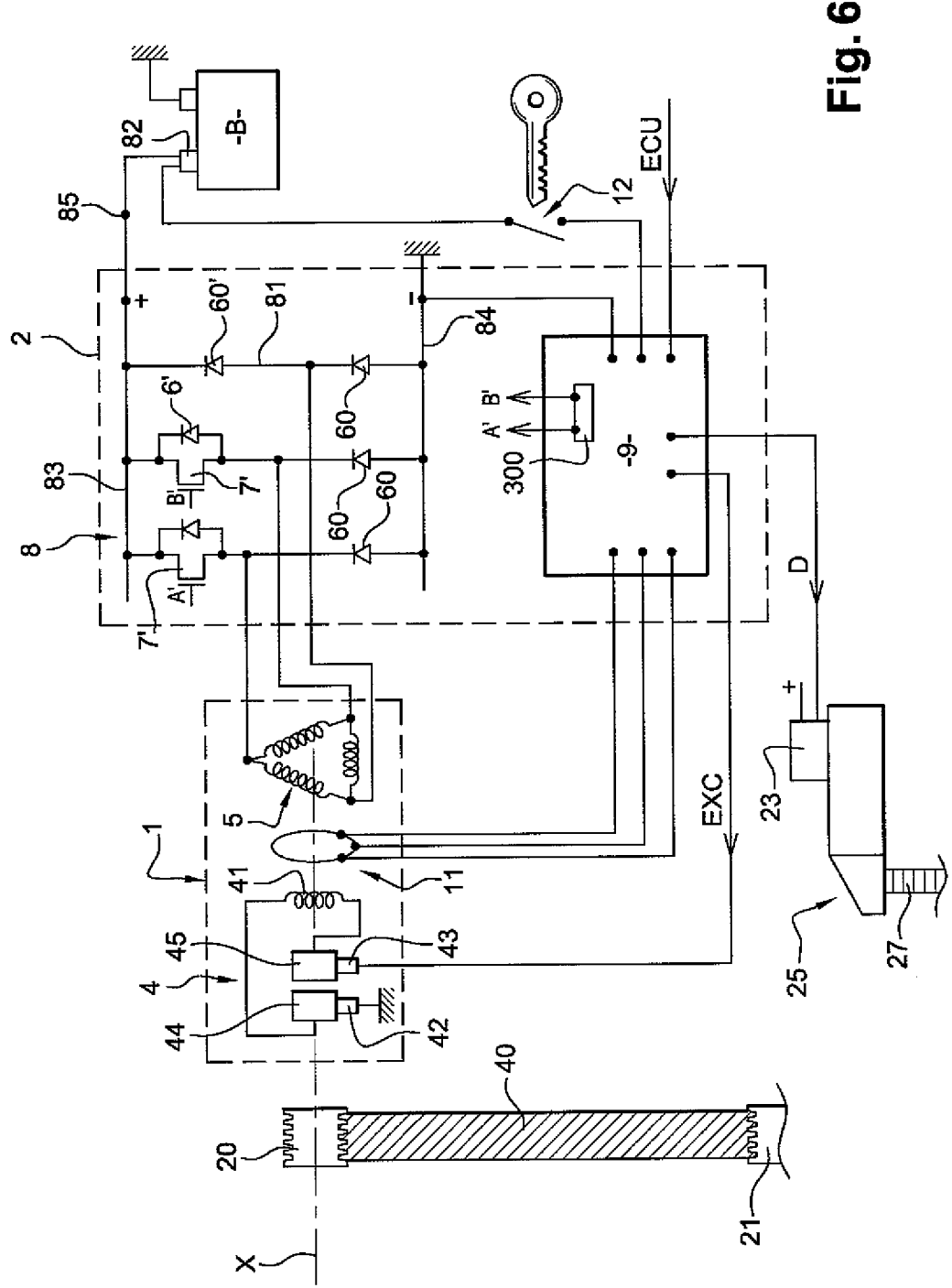

In the way cited above, the number of switches made "conducting" during the stop phase of the thermal engine is in one embodiment less than the number of phases as shown in the third embodiment of the invention in FIG. 6, in which only two transistors 7' are provided; the other transistor in FIG. 5 being replaced by a diode 60'.

The rotating electrical machine can therefore be an alternator working as an electromagnetic decelerator during the stop phase of the thermal engine, in order to decelerate the shaft 14 and brake the thermal engine with no mechanical contact.

The circuit 300 of the short-circuit means is simplified since it only controls two grids.

Figure 7:
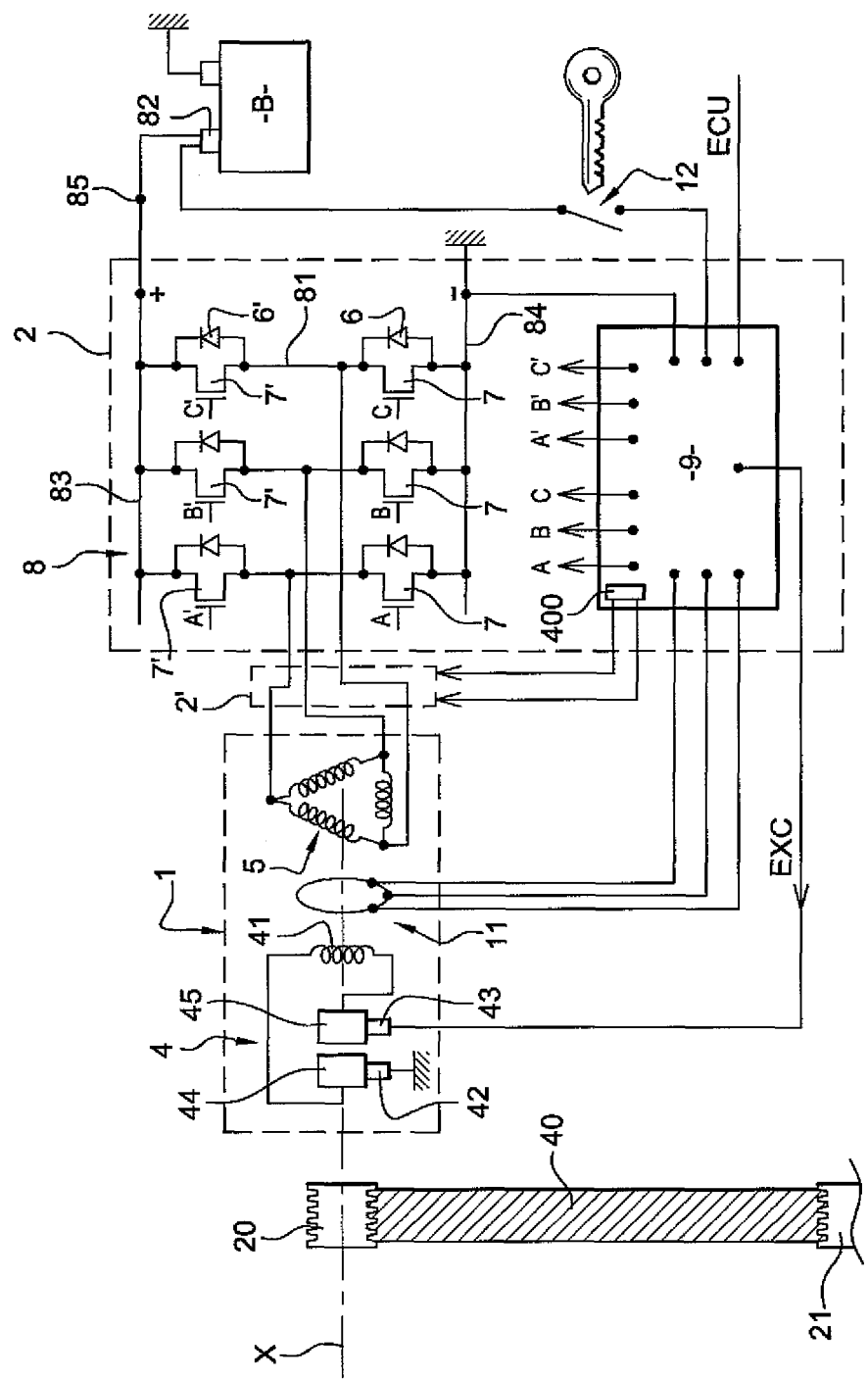

Alternatively, according to a fourth embodiment of the invention, the switches of the short-circuit means can be installed outside the current rectifying device 8. As illustrated in FIG. 7, they can be mounted in a module 2' close to the outputs of the coils 5 of the phases and be controlled by a circuit 400 belonging to the module 9. In a variant, the circuit 400 is distinct from the module 9 and is controlled, for example, by the engine control unit.

The module 2', like the unit 2, is equipped, for example, with transistors of the MOSFET type to short-circuit at least one phase, as well as two electrical power supply lines.

Of course, in these embodiments, the transistors of the MOSFET type which are drivable and controllable static power switches can be replaced by thyristors or any other type of controllable switch, such as a relay.

Of course, this invention is not limited to the exemplary embodiments described.

Thus, in the way cited above, the current rectifying device 8 of the alternator-starter or the alternator can comprise more than three arms or branches 81, for example five, six or seven arms.

Each power transistor 7-7', in one embodiment, is comprised of a set of transistors mounted in parallel to reduce heat build-up.

The alternator-starter or the alternator, in one embodiment, is cooled at least partly by water as described, for example, in document FR 2 835 978.

The transistors 7-7' of the MOSFET type of the device 8 alternatively are placed on electrically conducting tracks mounted with electric insulation on a mezzanine arranged on top of the rear bearing of the alternator-starter as described in document WO 2004/040738. One of the tracks can support at least two drivable transistors and the other of the tracks the diodes in order to obtain the assembly in FIG. 5.

The device 8 can comprise a plurality of modules mounted on the rear bearing of the alternator-starter as disclosed in document FR 2 886 477.

The drivers can belong to the modules cited above.

Thus, the module 9 in a variant is partly supported by the rear bearing of the alternator-starter and partly remote relative thereto.

Alternatively, as indicated in document WO 01//69762, the electronic unit 2 is supported by the external periphery of the casing of the alternator-starter.

In the light of this document WO 01//69762, the voltage regulator can be supported by the rear bearing of the alternator-starter, thus being remote relative to the remainder of the module 9 and connected to said module.

The electronic unit 2 can be remote and belong to a closing lid of a drum for receiving energy storage units such as batteries or "super capacitors" or ultra-capacitors, as described in document WO 2006/100391.

The pulleys 20, 21 and belt 40 can be replaced by another movement transmission device comprising for example toothed wheels and at least one chain or by gears.

The alternator-starter, instead of being remote, can be of the integrated type mounted in an adjacent manner to at least one clutch situated between the output of the crankshaft of the thermal engine and the input shaft of a movement transmission, such as a gear box, as described for example in document WO 00/06897.

This alternator-starter can be mounted upstream or, alternatively, downstream of the clutch(es). For example, the alternator-starter can act on one of the shafts of the gear box.

In all cases, the alternator-starter is connected to the crankshaft of the thermal engine.

Alternatively, the sensors 11 or the resolver are remote relative to the alternator-starter.

Thus, alternatively, the position or rotational speed of the crankshaft of the thermal engine can be directly measured and position sensors already present on the motor vehicle can be used.

Of course, the number of functions managed by the module 9 depends on the applications and particularly on the power of the alternator-starter. This module 9 can thus perform a lesser number of functions, for example it may not fulfil the "boost" function or the energy recovery function and can be simplified, as well as the device 8.

Of course, the alternator-starter or the alternator can be of the brushless type, the field coil in this case being fixed so that the brushes and slip rings are eliminated.

The transistors 7-7' can be controlled in the way cited above as in document FR-A-2 745 445 or, alternatively, by pulse width control as described in document WO 2005/109624, to which reference should be made.

On account of the invention, during the stop phase of the thermal engine the shutdown time of the thermal engine is reduced as well as the noise and vibration phenomena.

Passenger comfort is thus increased.

It will be noted that the resistive torque, and thus the braking, is overall proportional to the excitation current of the field coil(s) of the rotor so that this resistive torque can be adjusted in the way cited above. All the energy is dissipated in the machine which enables high resistive torque to be obtained without re-injecting energy into the battery.

Only at least one of the transistors of one of the series of transistors 7-T is "conducting", so that there is no risk of the rotor moving and so that this does not pose a safety problem.

The number of short-circuit phases depends on the applications. One phase, at least two phases or all the phases can be short-circuited.

The invention claimed is:

1. A method for braking a thermal engine of a motor vehicle using a reversible multi-phase rotating electrical machine (1) connected to the thermal engine and comprising a stator (16), a rotor (4) comprising at least one field coil (41) and a voltage regulator driving the at least one field coil (41) of the rotor (4), the method comprising the steps of:
   short-circuiting at least one phase of the rotating electrical machine during a stop phase of the thermal engine;
   exciting the at least one field coil (41) of the rotor (4) by the regulator during the stop phase of the thermal engine so as to generate a resistive torque on the rotor;
   pre-magnetizing the rotor; and
   varying the supply of current to the field coil so that the PWM voltage duty cycle of the voltage regulator increases from a first predetermined value to the maximum duty cycle value while the speed of the thermal engine shaft decreases from a first predetermined speed value to a second predetermined speed and the PWM voltage duty cycle of the voltage regulator stays at the maximum duty cycle value while the speed of the thermal engine shaft decreases from a second predetermined speed value to a third predetermined speed.

2. The method according to claim 1, wherein all the phases of the rotating electrical machine are short-circuited during the stop phase of the thermal engine.

3. The method according to claim 1, wherein the at least one field coil (41) of the rotor (4) of the rotating electrical machine is driven during the stop phase of the thermal engine so that the induced current in a closed circuit created by short-circuiting the at least one phase of the rotating electrical machine is adjustable and variable in order to obtain better deceleration and breaking of the rotor.

4. The method according to claim 3, wherein the at least one field coil (41) of the rotor (4) of the rotating electrical machine is driven during the stop phase of the thermal engine by means of the voltage regulator.

5. The method according to claim 1, wherein excitation of the at least one field coil (41) of the rotor (4) is continued after the thermal engine has stopped.

6. The method according to claim 1, wherein the rotating electrical machine further comprises a current rectifying device (8) including at least one controllable switch; and wherein the at least one controllable switch is made conducting during the stop phase of the thermal engine in order to short-circuit at least one phase of the rotating electrical machine.

7. The method according to claim 6, wherein the current rectifying device (8) further includes a drivable switch; and wherein the at least one controllable switch (7-7') of the current rectifying device (8) of the rotating electrical machine is made conducting, and wherein the drivable switch is connected to a power supply line (83, 84) of the current rectifying device (8).

8. The method according to claim 7, wherein the at least one controllable switch (7-7'), mounted instead of a current rectifying element (60) of the current rectifying device (8) is made conducting, and wherein the controllable switch is connected to a power supply line (83, 84) of the current rectifying device (8).

9. The method according to claim 7, wherein the at least one controllable switch is made conducting by means of a management module (9) combined with the current rectifying device (8).

10. The method according to claim 1, wherein the voltage regulator supplies the varying electric current to the at least one field coil (41) in a pulse mode of a varying duty cycle.

11. A reversible multi-phase rotating electrical machine intended to be connected to a thermal engine of a motor vehicle, the rotating electrical machine comprising a stator (16), a rotor (4) comprising at least one field coil (41), the rotating electrical machine provided to brake the thermal engine during a stop phase thereof, the rotating electrical machine comprising:
- short-circuit means for short-circuiting at least one of phases of the rotating electrical machine during the stop phase of the thermal engine; and
- supply means for supply power to the at least one field coil (41) of the rotor (4) in order to excite the at least one field coil during the stop phase of the thermal engine;
- the supply means being provided for pre-magnetizing the rotor and for varying the supply of current to the field coil so that the PWM voltage duty cycle of the voltage regulator increases from a first predetermined value to the maximum duty cycle value while the speed of the thermal engine shaft decreases from a first predetermined speed value to a second predetermined speed and the PWM voltage duty cycle of the voltage regulator stays at the maximum duty cycle value while the speed of the thermal engine shaft decreases from a second predetermined speed value to a third predetermined speed.

12. The machine according to claim 11, wherein the short-circuit means comprise at least one controllable switch made conducting during the stop phase of the thermal engine in order to short-circuit at least one phase of the rotating electrical machine.

13. The machine according to claim 12, further comprising a current rectifying device (8) equipped with drivable switches (7, 7'), wherein at least one of the drivable switches (7, 7') belongs to the short-circuit means and is connected to a power supply line of the current rectifying device (8).

14. The machine according to claim 12, further comprising a current rectifying device (8) equipped with current rectifying elements (60), wherein the at least one controllable switch of the short-circuit means is mounted instead of one of the current rectifying elements (60) and is connected to a power supply line of the current rectifying device (8).

* * * * *